Sept. 21, 1943.    S. C. WATSON    2,329,733
VARIABLE SPEED TRANSMISSION
Filed June 3, 1942    4 Sheets-Sheet 2

Inventor
Sydney C. Watson
by Parker & Carter
Attorneys

Sept. 21, 1943. S. C. WATSON 2,329,733
VARIABLE SPEED TRANSMISSION
Filed June 3, 1942 4 Sheets-Sheet 3

Inventor
Sydney C. Watson
by Parker & Carter
Attorneys

Sept. 21, 1943.  S. C. WATSON  2,329,733
VARIABLE SPEED TRANSMISSION
Filed June 3, 1942    4 Sheets-Sheet 4
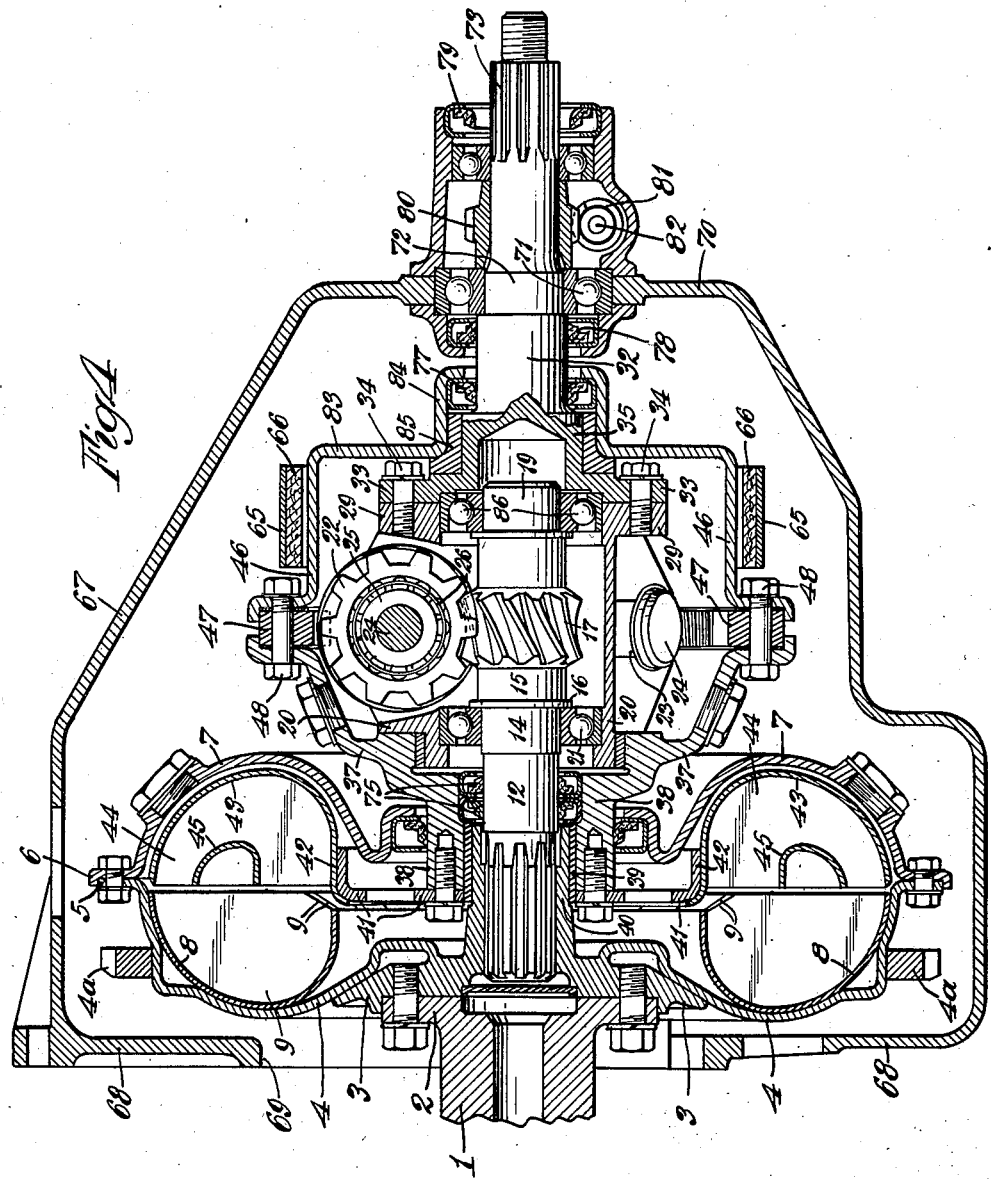
Inventor
Sydney C. Watson
by Parker Carter
Attorneys Patented Sept. 21, 1943

2,329,733

UNITED STATES PATENT OFFICE 2,329,733

VARIABLE SPEED TRANSMISSION

Sydney C. Watson, Chicago, Ill., assignor to Tor-Vel Associates

Application June 3, 1942, Serial No. 445,553

20 Claims. (Cl. 74—89.5)

This invention relates to a variable speed transmission and comprises, in the particular form here shown, a device to transmit mechanical power from a prime mover or source of power to any point where power is needed and to any device which is required to be driven or propelled. Among such devices are machines, machine tools, vehicles, ships, and other articles and mechanisms. One object of the invention is to provide a transmission system through which power is transmitted under conditions where a varying torque is required—that is to say, where a torque is required at times which is higher than that available from the prime mover directly. An illustration of this condition is that of the high starting torque required by motor vehicles or the operation of such vehicles in mountainous country, particularly with heavy loads, where the torque requirements vary.

Another object of the invention is to provide a variable speed transmission which will automatically vary the torque delivered in response to variations in torque demand or load.

Another object of the invention is to provide such a torque converting device which operates automatically in response to variations in the torque demand, and which in addition is arranged to provide a positive mechanical drive under certain conditions, the drive comprising a geared reduction means.

Another object of the invention is to provide a transmission of the type stated and in which means are provided to permit stopping the driven member without disconnecting or disengaging the driving member from the driven member. An illustration of this use is a self-propelled vehicle using a non-self-starting internal combustion engine in which it is desirable to permit the engine to continue to run while the vehicle remains stationary.

Another object of the device is to provide means in connection with a transmission of the type mentioned in which the reversal of direction of rotation of the driven member may be accomplished without stopping, disconnecting, or disengaging the driving member and without the necessity of using any separate reversing mechanism.

Another object is to provide means in connection with a transmission of the type mentioned whereby the invention may be used as a brake to check or decrease the rotative speed of the driven member. Such a necessity may occur in the case of a self-propelled vehicle when it descends an incline.

Another object is to provide in a transmission of the type mentioned means which will in effect provide a cushion or a protection which prevents damage or breakage, either to the driving or driven member. An example of such a requirement is that of a rock crusher or a gyratory reducer, where instantaneous reversal at full speed may be required. Such a requirement may also occur in the case of military vehicles, such as tanks and the like which may meet any immovable obstacle under full power conditions.

Other objects will appear from time to time in the specification and claims.

This invention is illustrated more or less diagrammatically in the accompanying drawings, wherein:

Figure 4 is a longitudinal section generally similar to Figure 1, but showing a modified form of the invention.

Like parts are indicated by like characters throughout the specification and drawings.

Figure 1:
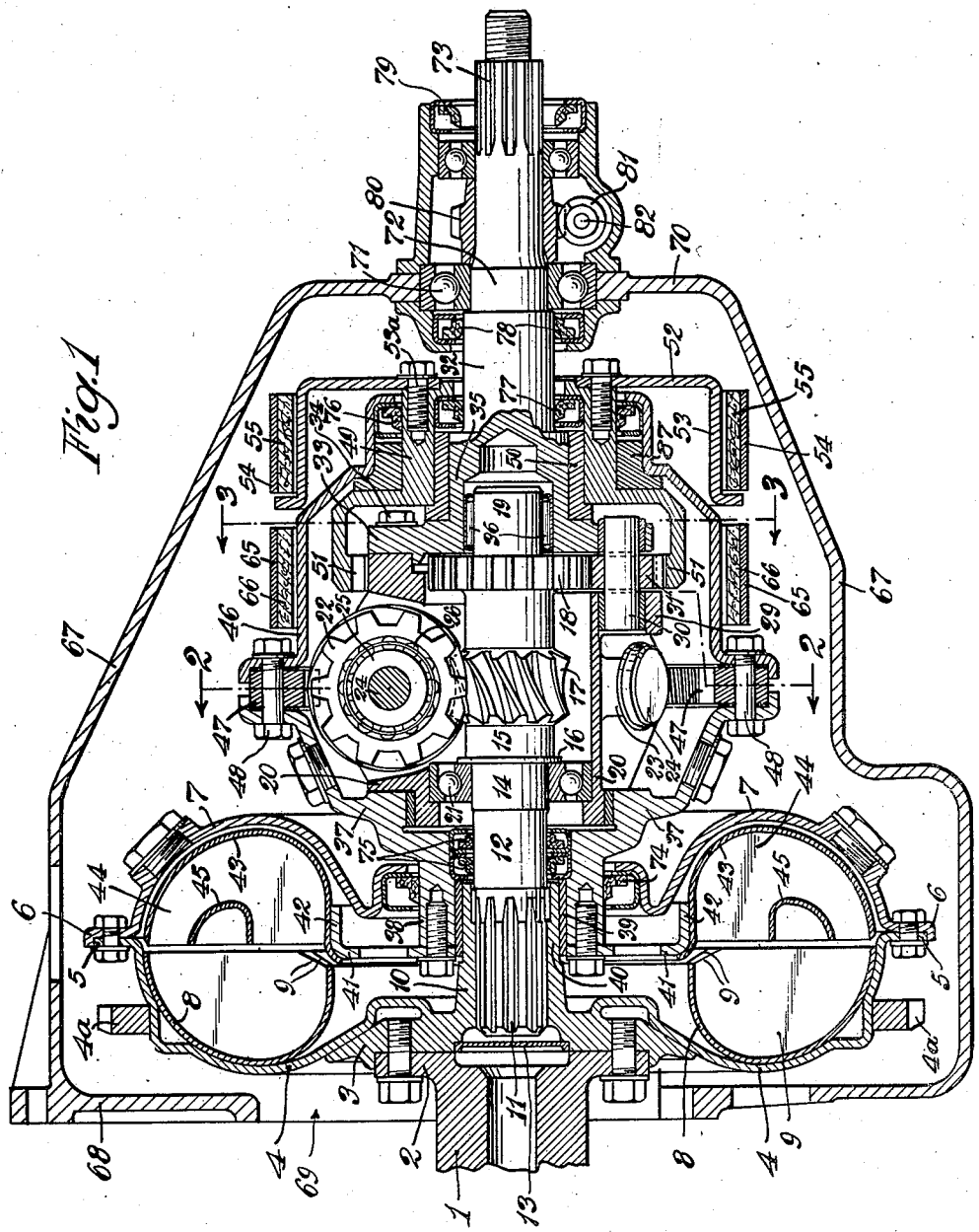
Figure 1 is a longitudinal section with parts in elevation, showing one form of the transmission of this invention.

As shown in the accompanying drawings, the invention is illustrated in connection with a variable speed transmission, which is primarily adapted for use in driving an automotive vehicle, although it may be adapted to many other uses.

1 is a driving shaft which may be driven from any suitable source of power, such as a prime mover. The shaft may be provided with a flange 2 to which is bolted or otherwise secured a member 3, which carries a portion 4 of a hydraulic coupling. At its outer edge the member 4 is provided with a flange 5, which is secured to a flange 6, formed as a part of a housing 7, which completes the enclosure of the hydraulic coupling. A starting gear 4a may be secured to the housing section 4. Secured to the housing section 4 is a fluid passage-forming member 8, in which is mounted a plurality of veins 9.

The member 3 is provided with a hollow interiorly splined extension 10, in which the splined end 11 of the shaft 12 is received. A closure member 13 may be provided to close the passage through the extension 10. The shaft 12 is provided with an enlargement 14 to receive a bearing, as will be described below, and may be enlarged again as at 15, to provide the shoulder against which a washer or separator 16 is positioned if desired. Formed on the shaft 12 is a worm gear 17 and a driving pinion 18. At its right-hand end, as shown in Figure 1, the shaft may be again reduced as at 19.

Surrounding the shaft 12 and the gears formed on it is an idler carrier 20. This carrier is supported at one point by ball, roller, or antifriction bearings 21, which have their inner races positioned on the enlargement 14 of the shaft 12, and their outer races positioned on the carrier 20. Rotatably mounted in the carrier 20 are one or more idler worms 22, each of which lies in a plane at an angle to the plane in which the axis of the worm gear 17 is located. This angle is usually approximately a right angle. The idler worms 22 are supported between suitably formed ears 23—23, formed integrally with the carrier 20, and they are held in place by shafts 24, upon each of which is mounted the inner race 25 of a ball bearing, whose balls 26 are in contact with suitably formed races 27, formed on the inner face of each of the gears 22. The invention is not limited to any particular type of bearing for the idler worms 22, and these members may be carried on ball bearings, roller bearings, or any other type of anti-friction bearings. They may be carried on plain bearings. If desired, the bearings may be formed in part, at least, of the members 22, or they may be separate and pressed into place or otherwise put into place and held in place. In other words, the members 22 may be carried on bearings of any desired type. Nuts 28 engage suitably threaded portions of the shafts 24 and hold the parts in the desired positions. These idler worms 22 are in mesh with and mounted so as to be capable of being rotatably driven by the worm gear 17 on the driving shaft 12, and they are made reversible, since their thread angle or tooth helix angle is steep enough to permit them being rotatably driven by the worm gear 17 on the driving shaft 12.

It will be noted that the members 22 are "barrel shaped" in order to conform to the shape of the internal worm gear, with which they mesh as described below. In an extreme case, however, if desired they could be made not barrel shaped, but with parallel faces if they are sufficiently short from end to end. Such a construction would not operate at the highest efficiency, however, and for that reason is probably not desirable.

Figure 3:
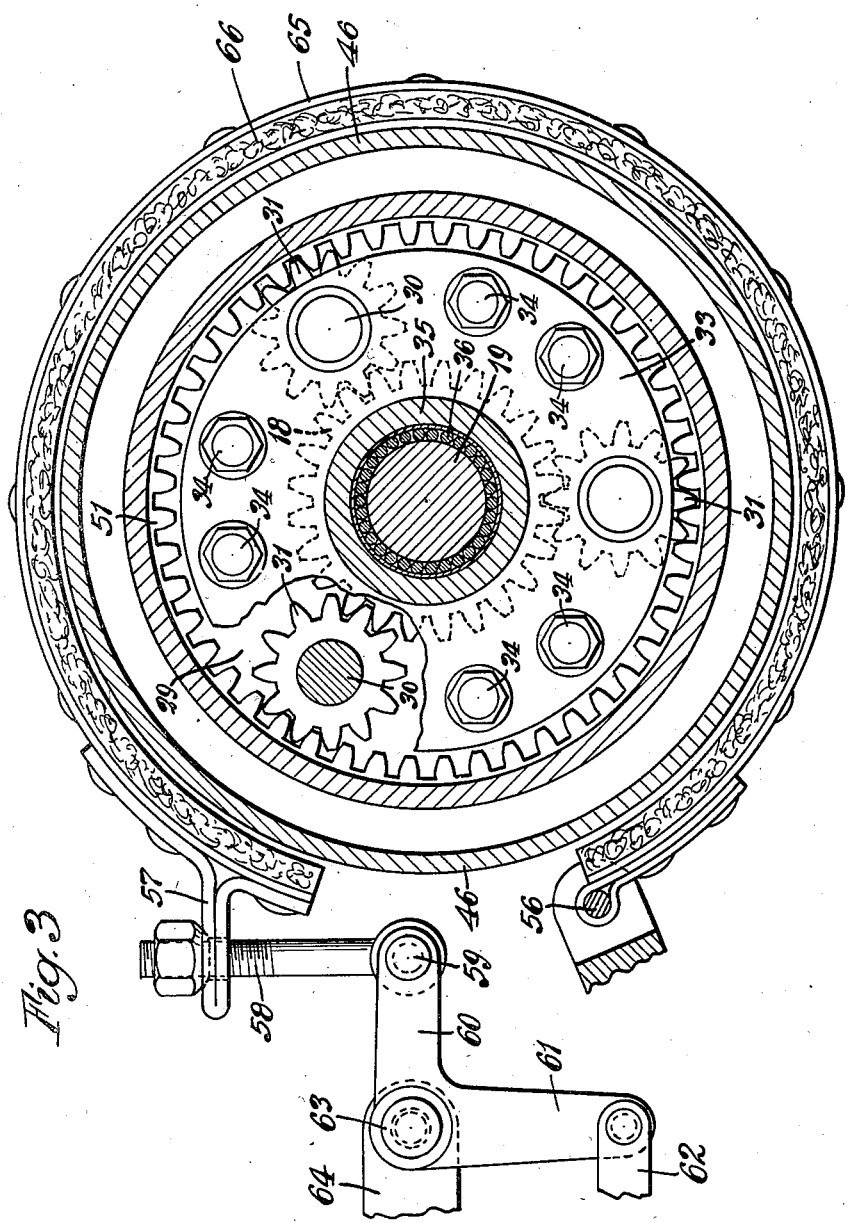
Figure 3 is a transverse section taken on an enlarged scale at line 3—3 of Figure 1.

As will be seen from Figure 3, primarily the idler carrier 20 is formed with a portion 29, which is shaped to receive a plurality of pins or shafts 30, upon each of which is rotatably mounted an idler gear 31. The axes of the gears 31 are parallel to the axis of the driving shaft 12, which carries the worm gear 17. These idler gears are in mesh with the driving pinion 18. This pinion 18 is integral with or fixed in relation to the driving shaft 12.

A stub shaft 32 is provided with a flange 33, which is rigidly attached to the idler carrier 20 or to the part 29 of the carrier 20 by means of screws 34 or bolts or any other means. The stub shaft 32 forms a power take-off point from the driven member and may be attached or connected to any member which it is desired to drive. The shaft 32 may, as shown, be provided with a hollow, enlarged, integral portion 35, within which the portion 19 of the driving shaft 12 is positioned, and an anti-friction bearing 36 may be positioned to support the portion 19 of the shaft 12 within this hollow portion 35 of the shaft 32.

Surrounding the assembly of the idler carrier, idler worms, idler gears, driving worm gear, driving shaft, and driven shaft is a housing which in the particular form of the invention here shown consists of a front shell 37 and a rear shell which will be described below. The front shell is provided with a cylindrical or tubular forward extension 38, within which is positioned a bushing or bearing 39. The bushing or bearing 39 is received on a cylindrical portion 40 of the splined extension 10. A flange 41 may be fastened to or formed as a part of the member 38, and it may terminate in a lateral bank flange if desired. Secured to the member 41, 42 by screws or otherwise, is a passage-forming member 43, to which are secured lateral veins 44. An additional passage-forming member 45 is secured to the veins 44 as shown. The invention is, of course, not limited to any particular type of fluid coupling, and the novelty of the invention does not reside in the details of construction of the fluid coupling.

The housing which encloses the assembly of gears above mentioned includes the front shell 37 and a rear shell 46. Between these two shells is secured an internal worm gear 47. This gear forms in effect a portion of the housing which encloses the assembly of gears and is secured in place by bolts 48 or otherwise, which also secure the front and rear sections of the shell in place. The internal worm gear 47 is in mesh with and capable of being rotatably driven by the idler worms 22, which are mounted in the idler carrier 20. The front end of the housing, including the member 38, projects into the fluid coupling as shown and is secured as mentioned to the runner or driven member of the fluid coupling.

From the description thus far it is clear that the driving worm gear 17 is attached to and rotatably driven by the source of power, and that the impeller of the driving member of the fluid coupling is simultaneously driven because it is rigidly connected to the driving shaft. It will also be seen that the internal worm gear 47 is rigidly connected to and rotatably driven by the runner or driven member or the fluid coupling.

The driving worm gear 17 and driven internal worm gear 47 are in turn rotatably connected to each other by the idler worms 22, which are in mesh with both the external driving gear and the internal driven gear.

Positioned about the stub shaft 32 and preferably carried upon the enlargement 35 is a generally cylindrical hub 49. A bushing, spacing member, or anti-friction bearing 50 may, if desired, be positioned between the members 35 and the member 49. Preferably integral with the member 49 is an internal gear 51, which is in mesh with the idler gears 31, which are themselves positioned for rotation on the idler carrier 20. The internal gear 51 is adapted to be driven rotatably from the pinion 18 by means of the idler gears 31. Secured to or formed integrally with the hub 49 is a member 52, which carries a brake drum 53. As shown the member 52 is secured to the hub 49 by screws 53a. It might, of course, be otherwise fastened to it.

A brake band 54 is provided with a lining 55 and is positioned about the brake drum 53.

A portion of the rear housing section 46 is arranged to be used as a brake drum or to receive a separately formed brake drum. A brake band 65 is positioned about this portion of the rear housing section and is provided with a lining 66. Any suitable operating means may be used for operating this brake band to cause it to engage and grip the brake drum in connection with the housing section 46. While any suitable means may be used for operating either of the brake bands 54 and 65, there is illustrated one such means in Figure 3. As there shown the brake band 65 is anchored at one end as at 56 and at its opposite end is provided with a member 57, which is perforated or slotted to engage a bolt 58. One end of this bolt is pivotally attached as at 59 to one arm of a bell crank 60. The opposite arm 61 of the bell crank has secured to it an operating link or member 62. The bell crank is pivoted as at 63 on any suitable support.

Surrounding substantially the entire assembly is a housing or casing 67 which may be provided with an end portion 68, which is partially open as at 69 and through which the driving shaft 1 passes. At its opposite end the casing 67 is provided with a wall 70, which is shaped to receive one race or an anti-friction bearing 71, the opposite race of which is received on a reduced portion 72 of the shaft 32. At its outer end the driven shaft 32 may be splined as at 73 or otherwise shaped for connection to a part which it is to drive.

Suitable sealing means are provided where needed to prevent the escape of fluid from the fluid coupling and to prevent the escape of the lubricant from the interior of the gear assembly and from bearings, thus a packing 74 is provided at one end of the fluid coupling. Packings 75 are provided on the driving shaft 12 adjacent the splined portion 11. Packings 76 and 77 are provided, respectively, on the exterior and on the interior of the cylindrical hub 49 and packings 78 and 79 may be provided upon the stub shaft 32 and upon its reduced portion as shown.

If desired a gear 80 may be secured to the stub shaft and may mesh wit" a second gear 81 upon a shaft 82. Such an arrangement may be used to operate a speedometer or for other purposes where desired.

In the modified form of Figure 4 the mechanism is the same as that described in connection with Figures 1 and 2. The difference lies in the fact that the second gear assembly, which includes the pinion 18, the gears 31, and the internal gear 51, has been omitted. This omission or change in the construction from that of Figure 1 involves also an omission of the brake drum 53 and the brake band 54; otherwise the parts are as above described.

The rear housing section 46 is provided with a wall member 83 which terminates in a cylindrical portion 84, within which the sealing member 77 above mentioned is received. The flange member 33, which is preferably integral with the stub shaft 32 is the same as previously described and is secured directly to the portion 29 of the idler carrier 20. Since the pinion 18 is omitted and idler gears 31 are omitted, the driving shaft is somewhat shorter than as shown in Figure 1, and the flange 33 can thus be readily attached to the idler carrier. An anti-friction bearing 86 is positioned on the reduced portion 19 of the driving shaft to support that end of the shaft and has its outer race positioned partly on the idler carrier and partly on the flange 33 and its interior race position on the reduced portion 19 of the driving shaft 12. A bushing or bearing sleeve 85 may if desired be positioned between the member 35 and the cylindrical portion 84 of the housing 46.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The use and operation of the invention are as follows:

In the first place, it will be recognized that the present mechanism includes two gear assemblies or groups of driven idler gears and worms. In the first group comprising the worms it is important to recognize that these worms are rotatably driven by the worm gear 17 on the driving shaft 12 by a sliding, screw-like action, while the idler gears comprising the second group are rotatably driven by the pinion 18 on the driving shaft 12 by a rolling or lever-like action, and thus the two groups of idlers are different in construction from each other and are differently driven. It will thus be seen that this arrangement of the two gear assemblies will result in the internal worm gears 47 being rotatably driven in the same direction as the external driving worm gear 17, while the internal gear 51 will be rotatably driven in the opposite direction to the external driving worm gear 17 while the idler carrier remains stationary and the drive is from the external driving worm gear through the idler worms and idler gears to the two internal gears.

Figure 2:
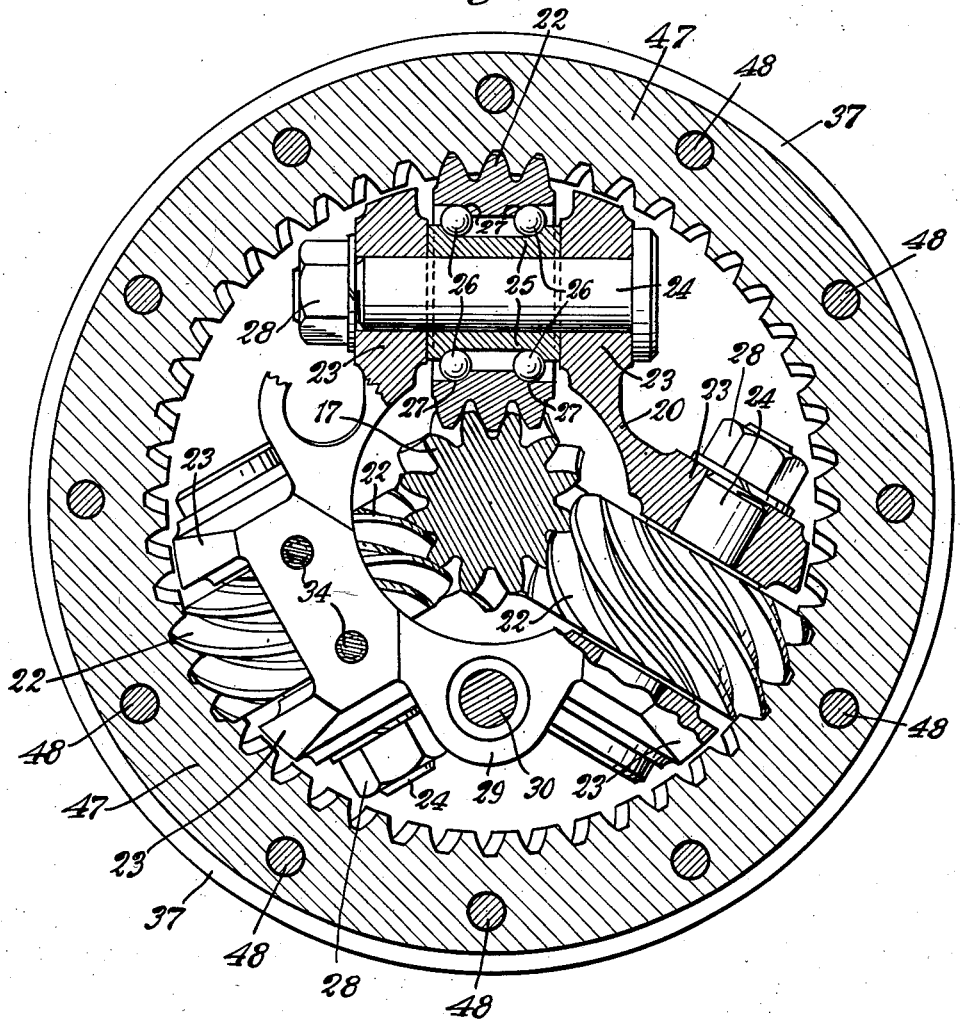
Figure 2 is a transverse section taken on an enlarged scale at line 2—2 of Figure 1.

In the form of the invention shown in Figure 1 there are, where there are two brake drums for use in operating, two brake systems. These brakes may be of the type shown—that is to say, external contacting, or they may be internal expanding, or otherwise. The particular type of brake chosen will depend upon its suitability to any particular design of the application, and the brakes may be operated in any desired manner or by any desired means. For example, they may be operated manually by foot pedal or hand-lever through any suitable linkage, or they may be operated hydraulically, pneumatically, or electrically, by automatic or hand controls if desired, and the invention is in no sense limited to any particular type of brake mechanism or brake operating means.

In considering the operation of the device as shown it will be first assumed that the vehicle or load to which the transmission is connected is stationary and that the engine or source of power is idling. During this condition the worm gear 17, attached to and rotating with the driving shaft 12, rotatably drives the idler worms, which in turn drive the internal worm gear with which they mesh. This internal gear is attached to the housing, which is itself attached to the runner or driven member of the fluid coupling, and this runner is therefore driven in the same direction as the impeller or driving member of the fluid coupling, since that member is fixed to the driving shaft and rotates with it. The relative rotation of the driving and driven members of the fluid coupling has thus the same ratio that the number of teeth in the driving worm gear have to the number of teeth in the driven internal worm gear.

From this it follows that it is possible to obtain a complete stall or stoppage of the driven member or shaft without a complete or 100 per cent slip of the fluid coupling. This is possible because even though the driven shaft is stationary, the runner or driven member of the fluid coupling is none the less positively driven by the rotation of the driving shaft and through the idlers and the internal worm gear.

When it is desired to obtain a reverse rotation of the driven member and shaft, the brake which operates on the housing or shell is actuated and thus prevents rotation of the housing or shell. When that occurs, the worm gear 17 on the driving shaft 12 then rotatably drives the idler worms, which in turn wind themselves around the geared track formed by the internal worm gear and rotatably drive the idler carrier 20 in a reverse direction, thus rotating the driven shaft in a direction opposite to that of the driving shaft.

During the reverse operation the runner or driven part of the fluid coupling, since it is secured to the housing, which is itself held stationary, is in a state of 100 per cent slip, and the fluid coupling is thus, in effect, by-passed and the drive is then positive from the source of power through the driving worm gear, idler worms, internal worm gear, and the idler carrier, the internal worm gear serving as a stationary gear track.

When the reversing operation is no longer desired, the brake band or other braking means which holds the housing stationary is released.

When during the forward movement of the vehicle or load an increased torque or turning effort is required, the brake which is connected to the member carrying the rear internal gear is actuated and rotation of this internal gear is prevented. When this gear is held stationary, the pinion is fixed upon the driving shaft and rotates with it, then rotatably drives the second group of idler gears, which are mounted in the idler carrier, and these idler gears then wind themselves around the stationary geared track formed by the second internal gear, and they thus rotatably drive the idler carrier and the driven shaft in the same direction as the driving shaft, but at a reduced rotative speed and with a torque or turning effort which is increased in direct relation to the gear ratio or rotative speed ratio which exists between the driving and driven members. When the torque is thus increased, it is to be noticed that the fluid coupling is, in effect, by-passed and the drive is positive between the driving and the driven members through the medium of the pinion, idler gears, and internal gear, which is in mesh with this second group of idler gears. Under this condition the fluid coupling is not in a state of complete or 100 per cent slip, since the runner or driven member of the fluid coupling is running at reduced speed, but is in turn adding its torque or turning effort through the medium of the idler worms to the rotation of the idler carrier, and consequently to the driven shaft or member. Under certain conditions of the operation it may be desirable to use an engine or other source of power as a brake to check or reduce the speed of the driven member. This is particularly important when the transmission is mounted in an automotive vehicle and the latter is descending an incline. To accomplish this braking action, the rear gear train is engaged by actuating the brake which controls this gear train and in particular controls the movement of the rear internal gear. When this is done, there is inserted a speed-up gear ratio between the source of power and the driven member whereby the normally driven member or load becomes the driving member and tends to drive the normally driving member or prime mover at an increased rate of rotation, which provides an effective check on the speed of the normally driven member.

The operation of the form of the device shown in Figure 4 is generally the same as the operation of the form of the device shown in Figure 1. A forward drive is possible and a reverse drive is possible. Since, however, the second or rear group of gears is omitted, the transmission cannot be used to accomplish a positive geared reduction. With these exceptions, therefore, the operation of the modified form of the device is as discussed above in connection with the form of Figure 1, and it need not be discussed herewith.

A further condition of operation of both forms of the device is important. It is the condition which occurs when the vehicle or load on which the transmission is mounted is moved in the forward direction and the transmission is operating to transmit driving power to the vehicle from the engine or other source of power in order to drive the vehicle or load under varying operating conditions. Assuming that the driving shaft is being driven and that the vehicle or load is in motion and that the torque requirements are not great, the entire transmission will operate or will tend to operate as a solid piece of material without relative movement of the parts with respect to each other. Thus the driving shaft will rotate the driving worm gear 17 and the idler worms will be carried bodily about without rotation on their own axes, and the internal worm gear with which they mesh will also be carried bodily about without any relative movement with respect to the other gears. Since the idler worms are carried bodily about, the idler carrier 20 goes with them and the driven shaft 32 is driven from the carrier and at the same speed as the driving shaft 12.

Assuming that the requirements on the driven shaft increase the resistance to rotation of that shaft until this resistance tends to hold back the rotation of the idler carrier and tends to cause relative movement in the first or forward group of gears, if this tendency is sufficient, the gear assembly may no longer rotate as a unit and relative movement of the parts within this assembly will occur. When that happens, the worm gear 17 may continue to rotate at substantially the same speed, and if the torque requirements are high enough, the idler worms will be rotated on their individual axes, and the axial movement of the worm thread will be imparted to the internal worm gear which is, of course, positively connected to the runner of the fluid coupling.

During the operation above described the fluid coupling is influencing the movement of the internal worm gear. Since the impeller of the fluid coupling is fixed to the driving shaft, it rotates with it, and this impeller by reason of the fluid in the fluid coupling tends to drive the runner which is fixed to the internal worm gear, and thus the impeller tends to rotate that gear. Under certain conditions the internal worm gear is rotated as fast as the driving shaft, and it is under these conditions that the gear assemblies rotate as a unit without relative movement between the parts. When, however, the torque requirements become sufficient to slow down the movement of the carrier, it and the internal worm gear will rotate more slowly than does the driving gear.

I claim:

1. In combination, in a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier; an internal worm gear positioned about and in mesh with said idlers, a housing carrying said internal gear, and a fluid coupling runner fixed in relation to said housing and positioned to be driven by said impeller, and a driven shaft fixed to said carrier.

2. In combination, in a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, an internal worm gear positioned about and in mesh with said idlers, a housing surrounding all of said gears and carrying said internal gear, and a fluid coupling runner fixed in relation to said housing and positioned to be driven by said impeller, and a driven shaft fixed to said carrier.

3. In combination, a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, an internal worm gear positioned about and in mesh with said idlers, a housing carrying said internal gear, and a fluid coupling runner fixed in relation to said housing and positioned to be driven by said impeller, and a driven shaft fixed to said carrier, and means for holding said internal gear against movement.

4. In combination, in a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, an internal worm gear positioned about and in mesh with said idlers, a housing surrounding all of said gears and carrying said internal gear, and a fluid coupling runner fixed in relation to said housing and positioned to be driven by said impeller, and a driven shaft fixed to said carrier, and means for holding said internal gear against movement.

5. In combination, in a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, the axes of said idler gears being at an angle to the axis of said driving shaft, an internal worm gear positioned about and in mesh with said idlers, a housing carrying said internal gear, and a fluid coupling runner fixed in relation to said housing and positioned to be driven by said impeller, and a driven shaft fixed to said carrier.

6. In combination, a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, the axes of said idler gears being at an angle to the axis of said driving shaft, an internal worm gear positioned about and in mesh with said idlers, a housing carrying said internal gear, and a fluid coupling runner fixed in relation to said housing and positioned to be driven by said impeller, and a driven shaft fixed to said carrier, and means for holding said internal gear against movement.

7. In combination, in a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, the axis of each of said idler gears being at right angles with respect to the axis of said driving shaft, an internal worm gear positioned about and in mesh with said idlers, a housing carrying said internal gear, and a fluid coupling runner fixed in relation to said housing and positioned to be driven by said impeller, and a driven shaft fixed to said carrier.

8. In combination, a variable speed drive, a driving shaft, a worm gear fixed thereon, a fluid coupling impeller fixed in relation to said shaft and adapted to be driven thereby, an idler carrier positioned about said shaft for movement with respect thereto, a plurality of idler worms mounted for movement in said carrier, the axis of each of said idler gears being at right angles with respect to the axis of said driving shaft, an internal worm gear positioned about and in mesh with said idlers, a housing carrying said internal gear, and a fluid coupling runner fixed in relation to said housing and positioned to be driven by said impeller, and a driven shaft fixed to said carrier, and means for holding said internal gear against movement.

9. In combination, in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gear, and a support for said internal gears.

10. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, and a support for said internal gear.

11. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, their axes being parallel to the axis of said drive shaft, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, and a support for said internal gear.

12. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, their axes being parallel to the axis of said drive shaft, said idler worms being in mesh with said worm gear, and said additional idler gears being in mesh with said pinion gear, and an internal worm positioned about said idler worms and in mesh with them, a housing fixed in relation to said internal worm gear, and a fluid coupling runner fixed to said housing, and in position to be driven by said impeller, and an internal gear in mesh with said idler gears, and a support for said internal gear.

13. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said support and said gear stationary.

14. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said housing stationary.

15. In combination, in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said support and said gear stationary, and means for holding said housing stationary.

16. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said support and said gear stationary.

17. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said housing stationary.

18. In combination, in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said husing, and in position to be driven by said impeller, and an internal gear in mesh with said idler gears, a support for said internal gear, and means for holding said support and said gear stationary, and means for holding said housing stationary.

19. In combination in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, and a plurality of additional idler gears mounted on said carrier, their axes being parallel to the axis of said drive shaft, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said support and said gear stationary, and means for holding said housing stationary.

20. In combination, in a variable speed drive, a driving shaft, a fluid impeller driven thereby, a worm gear fixed on said shaft, a pinion gear fixed on said shaft, an idler carrier positioned about said shaft for rotation with respect thereto, and a driven shaft fixed to said idler carrier, a plurality of idler worms mounted for rotation in said carrier, their axes being at right angles to the axis of said driving shaft, and a plurality of additional idler gears mounted on said carrier, their axes being parallel to the axis of said drive shaft, said idler worms being in mesh with said worm gear, and said additional idler gears being in mesh with said pinion gear, and an internal worm gear positioned about said idler worms and in mesh with them, a housing fixed in relation to said internal worm gear, and a fluid coupling runner fixed to said housing, and in position to be driven by said impeller, and an internal gear in mesh with said idler gears, a support for said internal gear, and means for holding said support and said gear stationary, and means for holding said housing stationary.

SYDNEY C. WATSON.